United States Patent
Nakamura et al.

(10) Patent No.: US 6,896,857 B2
(45) Date of Patent: May 24, 2005

(54) EXHAUST GAS PURIFYING CATALYST AND METHOD FOR MANUFACTURING THE SAME

(75) Inventors: Masanori Nakamura, Yokosuka (JP); Katsuo Suga, Yokohama (JP)

(73) Assignee: Nissan Motor Co., Ltd., Yokohama (JP)

(*) Notice: Subject to any disclaimer, the term of this patent is extended or adjusted under 35 U.S.C. 154(b) by 216 days.

(21) Appl. No.: 10/422,950

(22) Filed: Apr. 25, 2003

(65) Prior Publication Data

US 2003/0207759 A1 Nov. 6, 2003

(30) Foreign Application Priority Data

May 2, 2002 (JP) ........................................ 2002-130801

(51) Int. Cl.[7] ........................ C01B 21/00; B01J 23/00; B01J 21/00; B01J 29/00; B01J 20/00

(52) U.S. Cl. ........................ 423/213.5; 502/66; 502/74; 502/87; 502/302; 502/303; 502/304; 502/327; 502/328; 502/330; 502/333; 502/334; 502/339; 502/340; 502/344; 502/349; 502/355; 502/415; 502/439; 502/527.12; 502/527.13

(58) Field of Search ........................ 502/66, 74, 87, 502/302–304, 327, 328, 330, 333, 334, 339, 340, 344, 349, 355, 415, 439, 527.12, 527.13; 423/213.5

(56) References Cited

U.S. PATENT DOCUMENTS

| | | | | |
|---|---|---|---|---|
| 4,405,506 A | * | 9/1983 | Kim | 502/170 |
| 4,585,752 A | * | 4/1986 | Ernest | 502/304 |
| 4,639,432 A | * | 1/1987 | Holt et al. | 502/324 |
| 4,678,770 A | * | 7/1987 | Wan et al. | 502/304 |
| 4,738,947 A | * | 4/1988 | Wan et al. | 502/304 |
| 4,849,398 A | * | 7/1989 | Takada et al. | 502/303 |
| 5,064,803 A | * | 11/1991 | Nunan | 502/170 |
| 5,128,306 A | * | 7/1992 | Dettling et al. | 502/304 |
| 5,318,757 A | * | 6/1994 | Abe et al. | 422/174 |
| 5,320,999 A | * | 6/1994 | Muramatsu et al. | 502/303 |
| 5,334,570 A | * | 8/1994 | Beauseigneur et al. | 502/304 |
| 5,439,865 A | * | 8/1995 | Abe et al. | 502/333 |
| 5,462,907 A | * | 10/1995 | Farrauto et al. | 502/304 |
| 5,496,788 A | * | 3/1996 | Domesle et al. | 502/333 |
| 5,597,771 A | * | 1/1997 | Hu et al. | 502/304 |
| 5,856,263 A | * | 1/1999 | Bhasin et al. | 502/333 |
| 5,972,830 A | * | 10/1999 | Yoshida et al. | 502/304 |
| 6,093,378 A | * | 7/2000 | Deeba et al. | 423/213.5 |
| 6,248,684 B1 | * | 6/2001 | Yavuz et al. | 502/66 |
| 6,335,305 B1 | * | 1/2002 | Suzuki et al. | 502/325 |
| 6,350,421 B1 | * | 2/2002 | Strehlau et al. | 423/213.2 |
| 6,395,675 B1 | * | 5/2002 | Suga et al. | 502/326 |
| 6,413,904 B1 | * | 7/2002 | Strehlau et al. | 502/328 |
| 6,468,484 B1 | * | 10/2002 | Dou et al. | 423/213.2 |
| 6,468,941 B1 | * | 10/2002 | Bortun et al. | 502/300 |

FOREIGN PATENT DOCUMENTS

| | | |
|---|---|---|
| JP | 5-168860 A | 7/1993 |
| JP | 10-309461 A | 11/1998 |
| JP | 11-47593 A | 2/1999 |

* cited by examiner

*Primary Examiner*—Cam N. Nguyen
(74) *Attorney, Agent, or Firm*—Foley & Lardner LLP

(57) ABSTRACT

An exhaust gas purifying catalyst comprises a powder including a porous material having a specific surface area of 150 m$^2$/g or more, cerium and platinum. Cerium and Platinum are loaded on the porous material. The powder has platinum dispersion of 70% or more before baking and platinum dispersion of 50% or more after baking in air at 700° C. Additionally, a reduction rate R of the platinum dispersion after the baking against the platinum dispersion before the baking is below 40%. The reduction rate R is represented by a following equation (1):

$$R = (1-(\text{Pt dispersion after baking})/(\text{Pt dispersion before baking})) \times 100 \quad (1).$$

17 Claims, 6 Drawing Sheets

EXHAUST GAS PURIFYING CATALYST AND METHOD FOR MANUFACTURING THE SAME

BACKGROUND OF THE INVENTION

1. Field of the Invention

The present invention relates to an exhaust gas purifying catalyst for purifying hydrocarbons (HC), carbon monoxide (CO), and nitrogen oxides (NOx) contained in exhaust gas discharged from internal combustion engines for boilers and automobiles (gasoline, diesel-driven), a method for manufacturing the same, and a method for purifying exhaust gas using the foregoing. The present invention is particularly focused on NOx purification in a lean region and a method for manufacturing the catalyst.

2. Description of the Related Art

In recent years, there has been a large demand for low-fuel-consumption automobiles in view of the problems of the depletion of petroleum resources and global warming. Concerning the gasoline automobile, development of lean-burn automobiles has drawn attention. In lean-burn automobiles, exhaust gas atmosphere in a lean-burn driving mode becomes lean (oxygen-excessive atmosphere) as compared to a state of a theoretical air-fuel ratio. However, if a usual three-way catalyst is used in such a lean region, there has been a problem of an insufficient NOx purifying operation affected by excessive oxygen. Accordingly, the development of a catalyst capable of purifying NOx even in oxygen-excessive conditions has been long awaited.

In this context, various catalysts for purifying NOx in the lean region have been proposed heretofore. For example, there is a proposed catalyst which stores NOx in a lean region and purifies NOx by discharging NOx in a stoichiometric or rich condition, as represented by a catalyst loading platinum (Pt) and lanthanum (La) on a porous carrier thereof (Japanese Patent Application Laid-Open No. 5-168860 (1993)).

SUMMARY OF THE INVENTION

However, the conventional catalyst is poisoned by sulfur oxide (SOx) derived from sulfur contained in fuel and lubricant due to a NOx purifying reaction mechanism thereof, and the performance thereof is lowered. Because this poisoning by SOx is primary poisoning, the catalyst can recover from the poisoning if the catalyst is heated up to high temperature and SOx is desorbed therefrom. However, the SOx desorption temperature is in a range as high as 650° C. to 750° C., and it is necessary to locate the catalyst at a position near an exhaust port of an engine in order to heat the catalyst to the foregoing temperature albeit temporarily. When the catalyst is located in such a manner, temperature at the inlet of the catalyst is increased to a high temperature range from 350° C. to 500° C. even under normal driving conditions. Therefore, there have been problems that the NOx absorption function of the catalyst is not sufficiently exerted and that thermal degradation thereof advances.

Moreover, in order to absorb NOx at high temperature, a method using strong alkali metal has been conceived. However, the NOx desorption becomes difficult to occur by use of the strong alkali metal alone, thus lowering the NOx purification performance. Simultaneously, SOx is absorbed strongly by the strong alkali metal, causing a problem in that higher temperature is undesirably required in order to recover from the sulfur poisoning. In the conventional exhaust gas purifying catalyst, solving these points has been a problem.

The present invention was made in consideration of the above-described problems in the conventional exhaust gas purifying catalyst. It is an object of the present invention to provide an exhaust gas purifying catalyst capable of improving the durability of noble metal, absorbing NOx even at high temperature, and recovering from sulfur poisoning at low temperature even in the case of using a strong alkali metal, to provide a method for manufacturing the exhaust gas purifying catalyst, and to provide a method for purifying exhaust gas by use of the exhaust gas purifying catalyst.

The first aspect of the present invention provides an exhaust gas purifying catalyst, comprising: a powder comprising a porous material having a specific surface area of 150 $m^2/g$ or more, cerium, and platinum, cerium and platinum being loaded on the porous material, wherein the powder has platinum dispersion of 70% or more before baking and platinum dispersion of 50% or more after baking in air at 700° C., and a reduction rate R of the platinum dispersion after the baking against the platinum dispersion before the baking is below 40%, the reduction rate R being represented by a following equation (1): R=(1−(Pt dispersion after baking)/(Pt dispersion before baking))×100 (1).

The second aspect of the present invention provides an exhaust gas purifying catalyst, comprising: a powder comprising a porous material having a specific surface area of 150 $m^2/g$ or more, cerium and platinum, cerium and platinum being loaded on the porous material, wherein the powder has platinum dispersion of 70% or more before baking and platinum dispersion of 50% or more after baking in air at 700° C., and a integrated intensity of a diffraction peak originating from a Pt (311) plane at a diffraction angle of: $2\theta = 81.37 \pm 0.2°$ is about zero in an X-ray diffraction measurement by use of a CuKα radiation after the baking.

The third aspect of the present invention provides a method for manufacturing an exhaust gas purifying catalyst, comprising: preparing an aqueous slurry containing a powder comprising a porous material having a specific surface area of 150 $m^2/g$ or more, cerium and platinum, cerium and platinum being loaded on the porous material; adjusting pH of the aqueous slurry to a range from 5.8 to 6.3 inclusive; applying the aqueous slurry having the adjusted pH to a thermal-resistant inorganic support; drying the support having the slurry applied thereto; and baking the support after the drying, wherein the powder has platinum dispersion of 70% or more before heating and platinum dispersion of 50% or more after heating in air at 700° C., and a reduction rate R of the platinum dispersion after the heating against the platinum dispersion before the heating is below 40%, the reduction rate R being represented by a following equation (1): R=(1−(Pt dispersion after heating)/(Pt dispersion before heating))×100 (1).

The fourth aspect of the present invention provides a method for manufacturing an exhaust gas purifying catalyst, comprising: (a) impregnating a powder of a porous material having a specific surface area of 150 $m^2/g$ or more with a cerium acetate solution, drying the powder, and then baking the powder; and (b) impregnating the powder with a tetraammine platinum hydroxide solution, drying the powder, and then baking the powder, wherein the powder is contained in the catalyst, the powder having cerium and platinum loaded thereon has platinum dispersion of 70% or more before heating and platinum dispersion of 50% or more after heating in air at 700° C., and a reduction rate R of the platinum dispersion after the heating against the platinum dispersion before the heating is below 40%, the reduction rate R being represented by a following equation (1): R=(1−(Pt dispersion after heating)/(Pt dispersion before heating))×100 (1).

The fifth aspect of the present invention provides a method for manufacturing an exhaust gas purifying catalyst, comprising: (a) impregnating a powder of a porous material having a specific surface area of 150 m²/g or more with a mixed solution of a cerium acetate solution and both or any one of a zirconium acetate solution and a lanthanum acetate solution, drying the powder, and then baking the powder; and (b) impregnating the powder with a tetraammine platinum hydroxide solution, drying the powder, and then baking the powder, wherein the powder is contained in the catalyst, the powder having cerium, platinum and both or any one of zirconium and lanthanum loaded thereon has platinum dispersion of 70% or more before heating and platinum dispersion of 50% or more after heating in air at 700° C., and a reduction rate R of the platinum dispersion after the heating against the platinum dispersion before the heating is below 40%, the reduction rate R being represented by a following equation (1): R=(1−(Pt dispersion after heating)/(Pt dispersion before heating))×100 (1).

The sixth aspect of the present invention provides A method for purifying an exhaust gas, comprising: preparing an exhaust gas purifying catalyst comprising a powder including a porous material having a specific surface area of 150 m²/g or more, cerium and platinum, cerium and platinum being loaded on the porous material, wherein the powder has platinum dispersion of 70% or more before baking and platinum dispersion of 50% or more after baking in air at 700° C., and a reduction rate R of the platinum dispersion after the baking against the platinum dispersion before the baking is below 40%, the reduction rate R being represented by a following equation (1): R=(1−(Pt dispersion after baking)/(Pt dispersion before baking))×100 (1); and an internal combustion engine having the exhaust gas purifying catalyst installed thereon is driven repeatedly in an air/fuel ratio ranging from 10 to 50 inclusive.

BRIEF DESCRIPTION OF THE DRAWINGS

The invention will now be described with reference to the accompanying drawings wherein.

DETAILED DESCRIPTION OF THE PREFERRED EMBODIMENT

Figure 1:
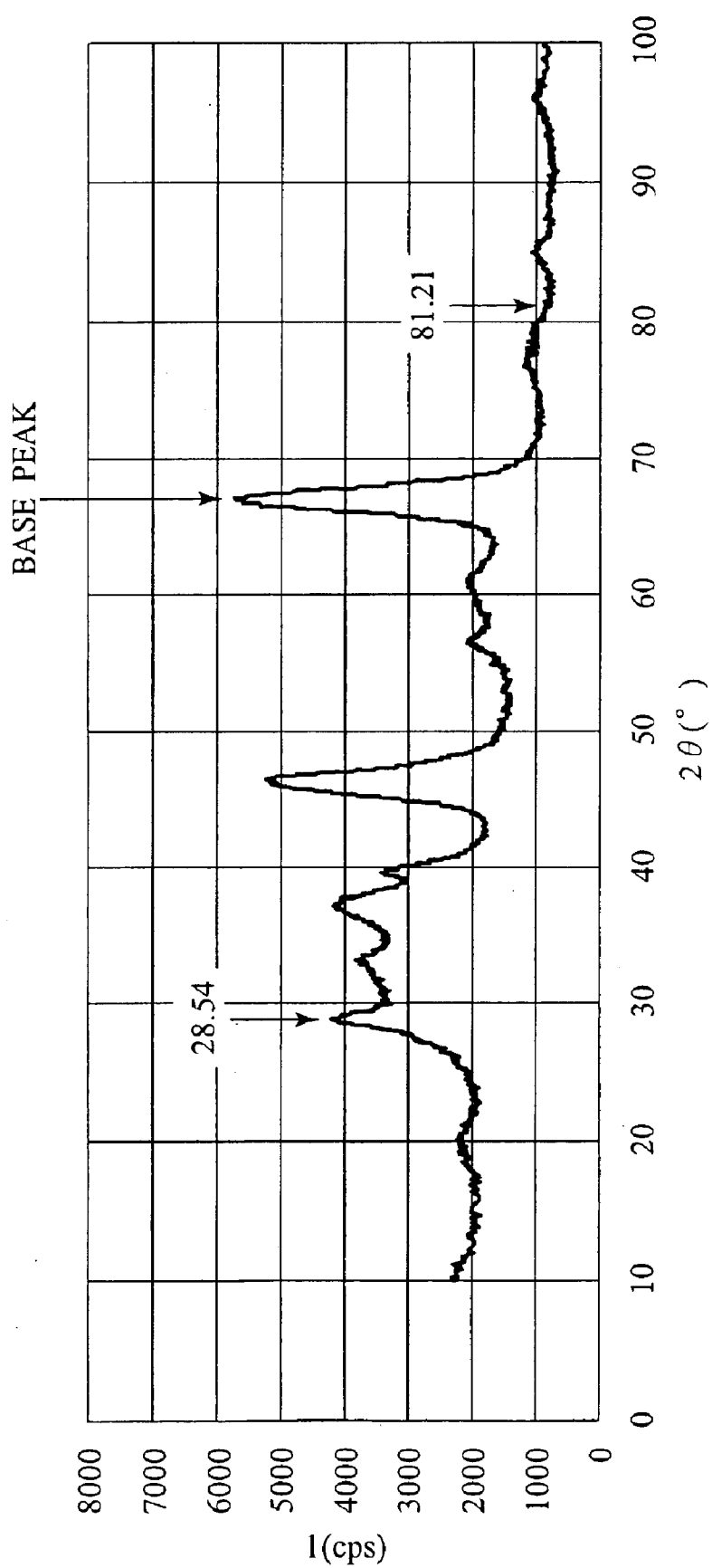
FIG. 1 is an X-ray diffraction pattern of powder A according to the example of the present invention.

Hereinafter, description will be made of embodiments of the present invention with reference to the drawings.

An exhaust gas purifying catalyst according to the present invention can improve the durability of noble metal (particularly, Pt) by use of powder, as will be described below, and can improve the NOx purification performance and sulfur poisoning recovery performance thereof. The powder for use in the catalyst of the present invention is powder in which cerium (Ce) and platinum (Pt) are loaded on a porous material having a specific surface area of 150 m²/g or more, and Pt dispersion is 70% or more before and 50% or more after baking in the air at 700° C., respectively. In an X-ray diffraction measurement by use of a CuKα radiation after the baking, a diffraction peak originating from a Pt (311) plane at a diffraction angle of: $2\theta=81.37\pm0.2°$ does not appear, in other words, integrated intensity of the diffraction peak originating from a Pt (311) plane at a diffraction angle of: $2\theta=81.37\pm0.2°$ is about zero. Alternatively, a reduction rate R of the Pt dispersion before and after the baking, which is represented by the following Equation (1), is less than 40%, and desirably, less than 30%.

$$R=(1-(\text{dispersion after baking})/(\text{dispersion before baking}))\times100 \quad (1)$$

Note that, when the Pt dispersion before and after the baking in the air of 700° C. is less than 70% and less than 50%, respectively or the reduction rate R of the Pt dispersion is 40% or more, the coagulation of Pt is prone to advance. Therefore, the NOx purification performance and the sulfur poisoning recovery performance are insufficient. Note that the integrated intensity of the diffraction peak originating from a Pt (311) plane at a diffraction angle of: $2\theta=81.37\pm0.2°$ is preferable to be about zero, but diffraction peaks of impurities and noise may appear.

By use of the powder as described above, the durability of the noble metal (Pt) will be improved, and the NOx purification performance and the sulfur poisoning recovery performance will be improved. In this case, as to the porous material having Ce and Pt loaded thereon, for example, it is desirable to use alumina because alumina has thermal resistance and a high specific surface area. In this case, it is necessary that the specific surface area be 150 m²/g or more. This is because the performance of the catalyst after a durability test cannot be secured sufficiently when the specific surface area is less than 150 m²/g.

Moreover, the durability of a Ce compound as a source of cerium also has an important correlation with the catalyst performance. In this powder, it is desirable that an integrated intensity of a diffraction peak originating from a cerium dioxide ($CeO_2$) (111) plane at a diffraction angle of: $2\theta=28.58\pm0.1°$ be less than 300000 in an X-ray diffraction measurement by use of a CuKα radiation after baking in the air of 700° C. for 1 hour. In other words, it is desirable that an integrated intensity ratio Ri of a diffraction peak originating from a $CeO_2$ (111) plane at a diffraction angle of: $2\theta=28.58\pm0.1°$ and a diffraction peak originating from a γ-alumina at a diffraction angle of: $2\theta=66.89\pm0.1°$ be less than 70 in an X-ray diffraction measurement by use of a CuKα radiation after baking in the air at 700° C. for 1 hour. Ri is represented by the following Equation (2).

$$Ri=(\text{integrated intensity of } CeO_2)/(\text{integrated intensity of γ-alumina})\times100 \quad (2)$$

Thus, the Ce compound will be highly dispersed, and both the NOx absorption performance and the sulfur poisoning recovery performance are improved. Moreover, with regard to the Ce compound as a source of cerium, it is desirable that a Ce compound is tervalent ($Ce_2O_3$) rather than quadrivalent ($CeO_2$) after baking in the air at 700° C. from the viewpoint of further improving the above-described performances. Note that this is based on findings by an X-ray photoelectron spectroscopy measurement.

Moreover, it is desirable that Pt be distributed on this Ce compound. If Pt is distributed on a portion other than the above-described compound, for example, on the porous material, then Pt becomes prone to segregate, and the durability thereof is lowered.

In order to improve the durability of the noble metal of the catalyst according to the present invention, it will also be necessary to enhance the durability of the porous material. From such a viewpoint, it is effective that the above-described powder be made to contain either or both zirconium (Zr) and lanthanum (La). Thus, the highly dispersed Ce compound and Zr/La are compounded with each other to bring a synergistic effect.

The catalyst according to the present invention is a catalyst that absorbs NOx, which will require a NOx absorbing material such as a compound of elements selected from alkaline metal, alkaline-earth metal and rare-earth elements. When consideration is made for the case of using the catalyst at high temperature, a cesium (Cs) compound having a strong NOx absorbing capability is effective. However, in order to further improve recovery from sulfur poisoning, this is desirable that the Ce compound be added simultaneously with the Cs compound, as this can lead to greater effect.

Moreover, it is desirable that the catalyst be adapted to have two or more catalyst layers so that catalytic functions can be distributed to each of the layers. For example, in the case of the NOx absorbing catalyst, the functions thereof are distributed in such a manner that a lower layer is in charge of absorption and a surface layer is in charge of purification, and thus the performance of the NOx catalyst will be greatly improved. Furthermore, the use of zeolite in an inner layer will enable the catalyst to function as a hydrocarbon (HC) absorbing catalyst that absorbs HC at low temperature such as the temperature at the time of engine start, and desorbs and purifies the HC when it reaches purification-enabling temperature. Furthermore, in order to further improve the catalyst performance, rhodium (Rh) and palladium (Pd) can be contained. Moreover, either or both ceria and a ceria-zirconia composite oxide can be further contained. Thus, sulfurization of Pt is prevented, and sulfur poisoning recovery is accelerated by a generation of hydrogen ($H_2$).

The above-described powder for use in the catalyst according to the present invention can be obtained by the following procedures. Porous material having a specific surface area of 150 $m^2/g$ or more is impregnated with a cerium acetate solution, before being dried and baked, and is then impregnated with a tetraammine platinum hydroxide solution, followed by the drying and baking thereof. Moreover, when the above-described powder further contains Zr and/or La, the powder is obtained by being impregnated with a mixed solution containing zirconium acetate and/or lanthanum acetate in addition to cerium acetate. Specifically, cerium acetate can be suitably used as salt of Ce, and tetraammine platinum hydroxide can be suitably used as salt of Pt. The reason for this is as follows. Specifically, when loading Ce and Pt on salt of a porous material, such as alumina, in the case of using cerium acetate and tetraammine platinum hydroxide, Ce and Pt can be loaded thereon in a highly-dispersed state because dissolution of the alumina surface is small in comparison in the case of using salt with strong acid, such as cerium nitrate and dinitrodiamine platinum salt.

The catalyst according to the present invention is obtained by the following processes. First, the above-described powder is made into slurry, and the pH of the slurry solution is adjusted to a range from 5.8 to 6.3. Then, the slurry is applied to a fire-resistant inorganic support, and then, excessive slurry on the substrate is blown off by allowing air to flow through the cells. After that, the coated substrate is dried and baked. Specifically, in order to apply the slurried porous powder loading the platinum group metals thereon, onto the fire-resistant inorganic support, the pH of the slurry solution becomes important. Without any adjustment, the slurry becomes weak alkaline to neutral. Therefore, it is extremely difficult for the slurry to be applied to the fire-resistant inorganic support, and even if the slurry is applied thereto, it will soon be exfoliated. Accordingly, it is necessary to set the pH value in the above-described range by adding thereto, acid such as acetic acid, to oxidize the slurry. Note that, as the fire-resistant inorganic support, it is possible to use a honeycomb structure made of, for example, ceramics such as cordierite and metal such as ferrite stainless steel.

The exhaust gas purifying catalyst according to the present invention can efficiently purify NOx when an air/fuel ratio is set in a range from 15 to 50 inclusive (a range where NOx is absorbed well) and in a range from 10.0 to 14.6 inclusive (a range where NOx is purified well). Therefore, this exhaust gas purifying catalyst can be provided to an internal combustion engine driven repeatedly in an air/fuel ratio (A/F) ranging from 10 to 50 inclusive for use.

The present invention will be described below more precisely based on Examples.

EXAMPLE 1

Figure 2:
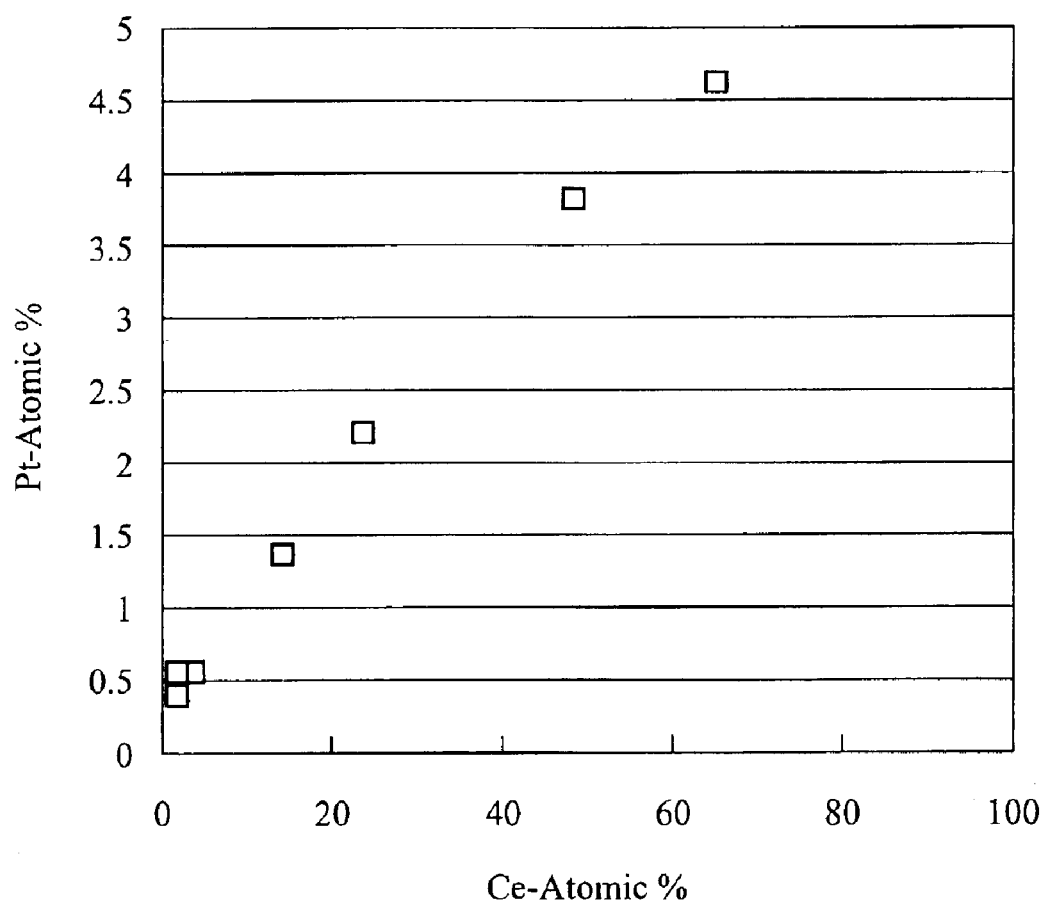
FIG. 2 is a graph showing a relationship between atomic ratios of Ce and Pt according to the powder A.

Active alumina (γ-alumina) having a specific surface area of 200 $m^2/g$ was impregnated with a cerium acetate solution, dried at 120° C. for 1 hour, and was then baked at 400° C. in the air for 1 hour to obtain powder. The Ce concentration of this powder was 10 wt % as $CeO_2$. Then, this powder was impregnated with a tetraammine platinum hydroxide solution, dried at 120° C. for 1 hour, and thereafter, baked at 400° C. in the air for 1 hour. Thus, powder A was obtained. Pt concentration of this powder A was 0.8 wt %. Table 1 shows properties of this powder A. Moreover, results of X-ray diffraction measurements after baking at 700° C. are shown in FIG. 1, and correlations between atomic ratios of Ce and Pt, which were obtained from TEM (transmission electron microscope) observations, are shown in FIG. 2. Furthermore, the integrated intensities and the relative intensities of the respective peaks in FIG. 1 are shown in Table 2. Relative intensities are calculated on the basis of the peak of γ-alumina (2θ=66.89), which is used as the porous carrier.

TABLE 1

| | Powder | | BET specific surface area $(m^2/g)$ | | Pt dispersion (%) | | |
|---|---|---|---|---|---|---|---|
| | Symbol | Salt of platinum | Salt of cerium | Before baking | After baking | Before baking | After baking | Reduction rate |
| Example | A | Tetraammmine platinum hydroxide | Cerium acetate | 174.5 | 173.6 | 99.0 | 72.6 | 26.7 |
| | E | Tetraammmine platinum hydroxide | Cerium nitrate | 187.5 | 176.6 | 91.7 | 65.7 | 28.4 |
| Comparative example | F | Dinitro diamine platinum salt | Cerium nitrate | 188.1 | 172.1 | 67.5 | 33.0 | 51.1 |
| | G | Tetraammmine platinum hydroxide | — | 175.1 | 150.3 | 66.8 | 9.2 | 86.2 |

TABLE 2

| Peak number | 2θ (°) | Integrated Intensity | Relative Intensity |
|---|---|---|---|
| 1 | 28.54 | 276000 | 63.59 |
| 2 | 33.08 | 378000 | 87.10 |
| 3 | 37.10 | 152000 | 35.02 |
| 4 | 39.63 | 143000 | 32.95 |
| 5 | 46.02 | 383000 | 88.25 |
| 6 | 56.34 | 63100 | 14.54 |
| 7 | 60.63 | 215000 | 49.54 |
| 8 | 66.89 | 434000 | 100.00 |
| 9 | 77.72 | 28100 | 6.47 |
| 10 | 81.21 | 0 | 0.00 |
| 11 | 84.95 | 69300 | 15.97 |
| 12 | 88.95 | 14800 | 3.41 |

Note that, for the X-ray diffraction, a wide-angle X-ray diffraction device, type MXP18VAHF (X-ray source: CuKα), made by Bruker AXS K.K., was used. Moreover, the Pt dispersions were measured in accordance with the following procedures by use of a full automatic CO gas absorption amount analyzer (R-6015 made by Ohkurariken Co., Ltd.).

1) heating up to 400° C. at 10° C./min. in a flow of 100% He gas;

2) oxidation treatment in a flow of an 10% $O_2$/He balance gas at 400° C.;

3) purging by 100% He gas for 5 minutes;

4) reduction treatment in a flow of 10% $H_2$/He balance gas at 400° C. for 15 minutes;

5) cooled down to 50° C. in a flow of 100% He gas; and 6) flowing 10% CO/He balance gas in a pulsing manner and obtaining the Pt dispersions from the CO absorption amounts.

Meanwhile, active alumina (γ-alumina) having a specific surface area of 200 $m^2/g$ was impregnated with a rhodium nitrate solution, dried at 120° C. for 1 hour, and was then baked at 400° C. in the air for 1 hour to obtain powder B. The Rh concentration of this powder B was 1.0 wt %.

Moreover, similarly, active alumina (γ-alumina) having a specific surface area of 200 $m^2/g$ was impregnated with a cerium acetate solution, dried at 120° C. for 1 hour, and was then baked at 400° C. in the air for 1 hour to obtain powder. The Ce concentration of this powder was 10 wt % as $CeO_2$. Then, this powder was impregnated with a tetraammine platinum hydroxide solution, dried at 120° C. for 1 hour, and thereafter, baked at 400° C. in the air for 1 hour. Thus, powder C was obtained. The Pt concentration of this powder C was 0.4 wt %.

Furthermore, ceria powder having a specific surface area of 120 $m^2/g$ was impregnated with a tetraammine platinum hydroxide solution, dried at 120° C. for 1 hour, and was then baked at 400° C. in the air for 1 hour to obtain powder D. The Pt concentration of this powder was 1.5 wt %.

Then, the above-described powder C of 724.5 g, the powder D of 42.3 g, active alumina (γ-alumina) of 88.2 g, alumina sol of 45 g and water of 900 g were poured into a magnetic ball mill, and were then mixed and milled to obtain a slurry solution. This slurry solution had acetic acid added so that the pH thereof could be 6.0. Then, this slurry was applied to a cordierite monolithic support (900 cells, catalyst capacity of 1.2 L), dried at 130° C. after removing extra slurry in the cells by airflow, and baked at 400° C. for 1 hour. Thus, a catalyst having a coating layer of 300 g/L was obtained. Subsequently, the above-described powder A of 543.6 g, the powder D of 63.5 g, the powder B of 212.4 g, active alumina (γ-alumina) of 35.5 g, alumina sol of 45 g and water of 900 g were poured into a magnetic ball mill, were then mixed and milled, and thus a slurry solution was obtained. The slurry solution thus obtained had acetic acid added so that the pH thereof could be 6.0. Then, this slurry solution was applied to the above-described coating layer, dried at 130° C. after removing extra slurry in the cells by airflow, and baked at 400° C. for 1 hour. Thus, a catalyst having a coating layer of 200 g/L was obtained. Then, this catalyst was immersed in a mixed solution of cesium acetate and cerium acetate to be impregnated with cesium and cerium. The amount of cesium was 50 g/L as $Cs_2O$, and the amount of cerium was 10 g/L as $CeO_2$.

EXAMPLE 2

Figure 3:
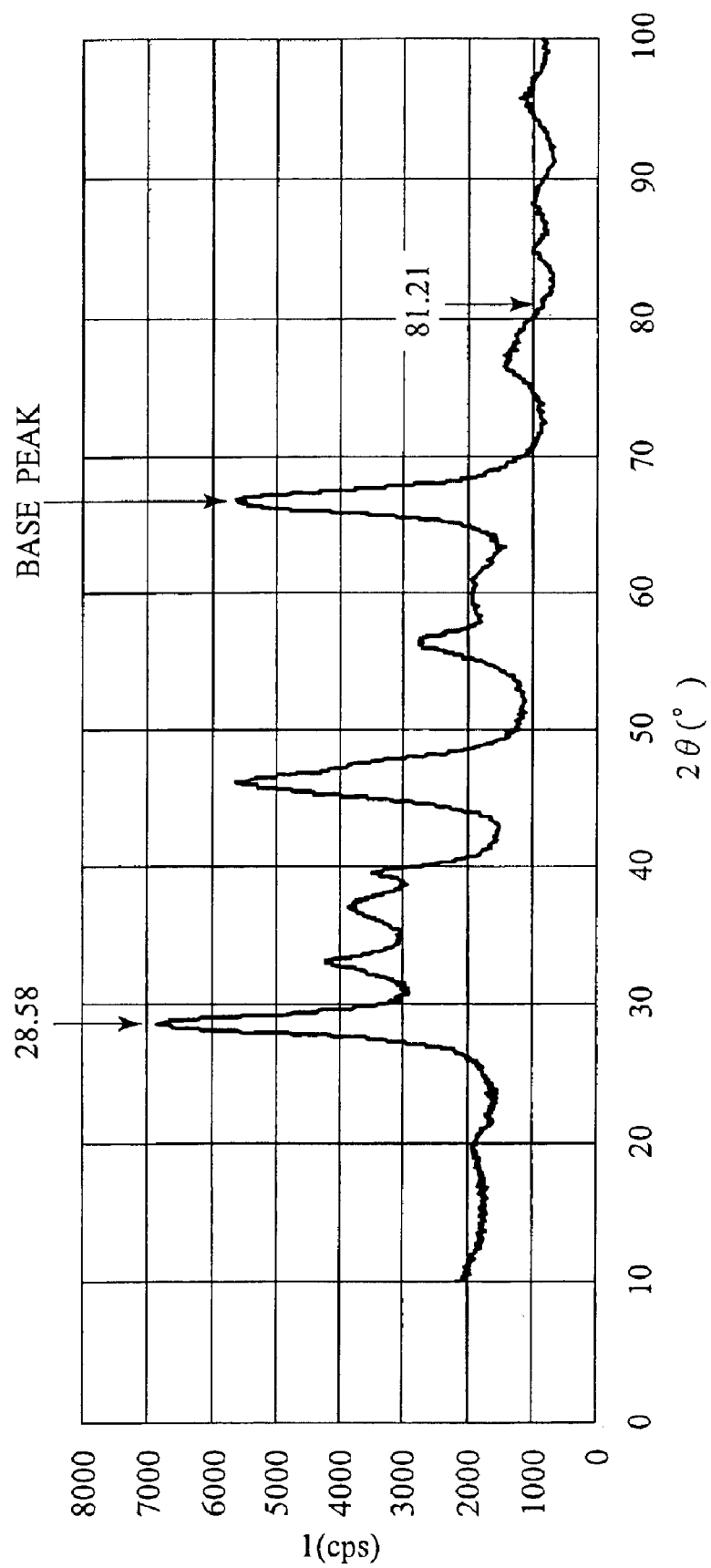
FIG. 3 is an X-ray diffraction pattern of powder E according to the example of the present invention.
Figure 4:
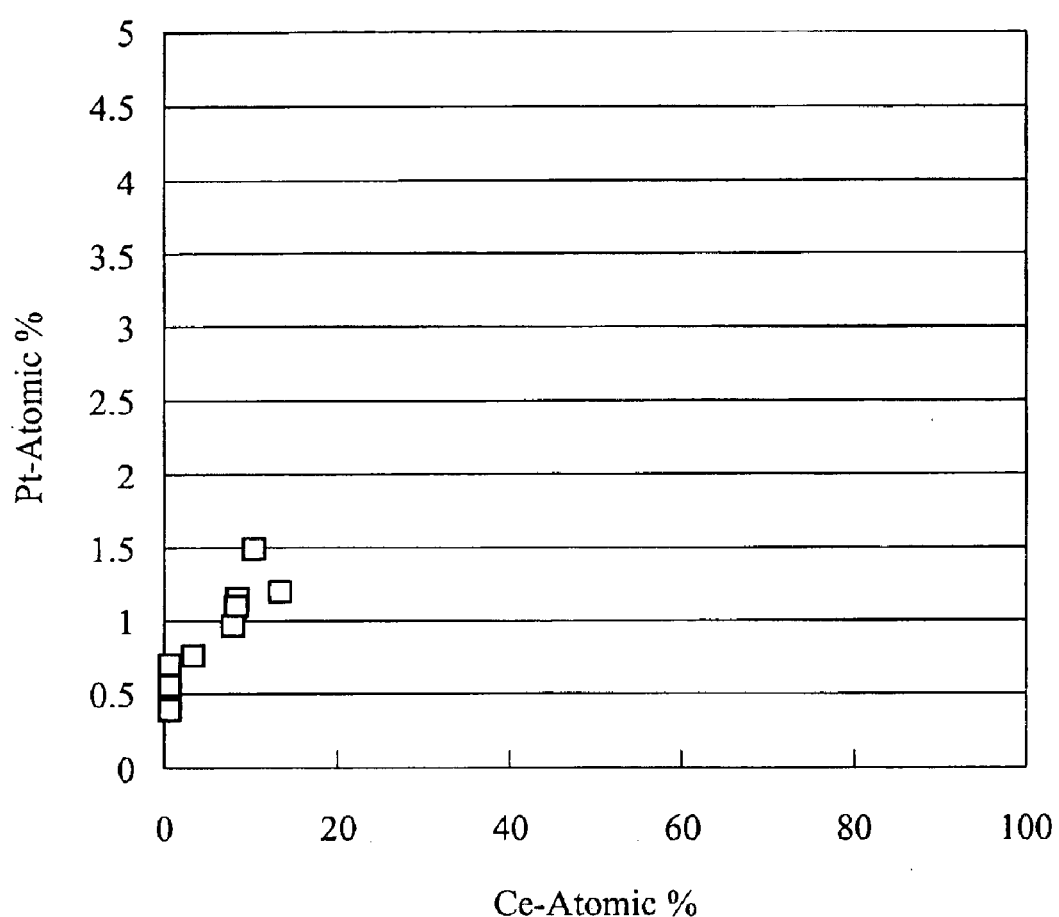
FIG. 4 is a graph showing a relationship between atomic ratios of Ce and Pt according to the powder E.

A catalyst according to this Example 2 was obtained in accordance with the same procedures as those of the above-described Example 1 except that the cerium acetate was replaced with cerium nitrate in preparation of the powders A and C of Example 1. Then, the powder obtained by replacing the cerium acetate of the powder A with the cerium nitrate was set as powder E, and properties thereof are also shown in Table 1. Moreover, results of X-ray diffraction measurements of the powder E after baking at 700° C. are shown in FIG. 3, and correlations between atomic ratios of Ce and Pt, which were obtained from TEM observations, are shown in FIG. 4. Furthermore, the integrated intensities and the relative intensities of the respective peaks in FIG. 3 are shown in Table 3. Relative intensities are calculated on the basis of the peak of γ-alumina (2θ=66.89), which is used as the porous carrier.

TABLE 3

| Peak number | 2θ (°) | Integrated Intensity | Relative Intensity |
|---|---|---|---|
| 1 | 28.58 | 407000 | 83.06 |
| 2 | 32.99 | 488000 | 99.59 |
| 3 | 37.10 | 207000 | 42.24 |
| 4 | 39.63 | 125000 | 25.51 |
| 5 | 46.39 | 445000 | 90.82 |
| 6 | 56.34 | 164000 | 33.47 |
| 7 | 60.35 | 130000 | 26.53 |
| 8 | 66.88 | 490000 | 100.00 |
| 9 | 77.65 | 49400 | 10.08 |
| 10 | 81.21 | 0 | 0.00 |
| 11 | 84.93 | 10400 | 2.12 |
| 12 | 88.57 | 82200 | 16.78 |

COMPARATIVE EXAMPLE 1

Figure 5:
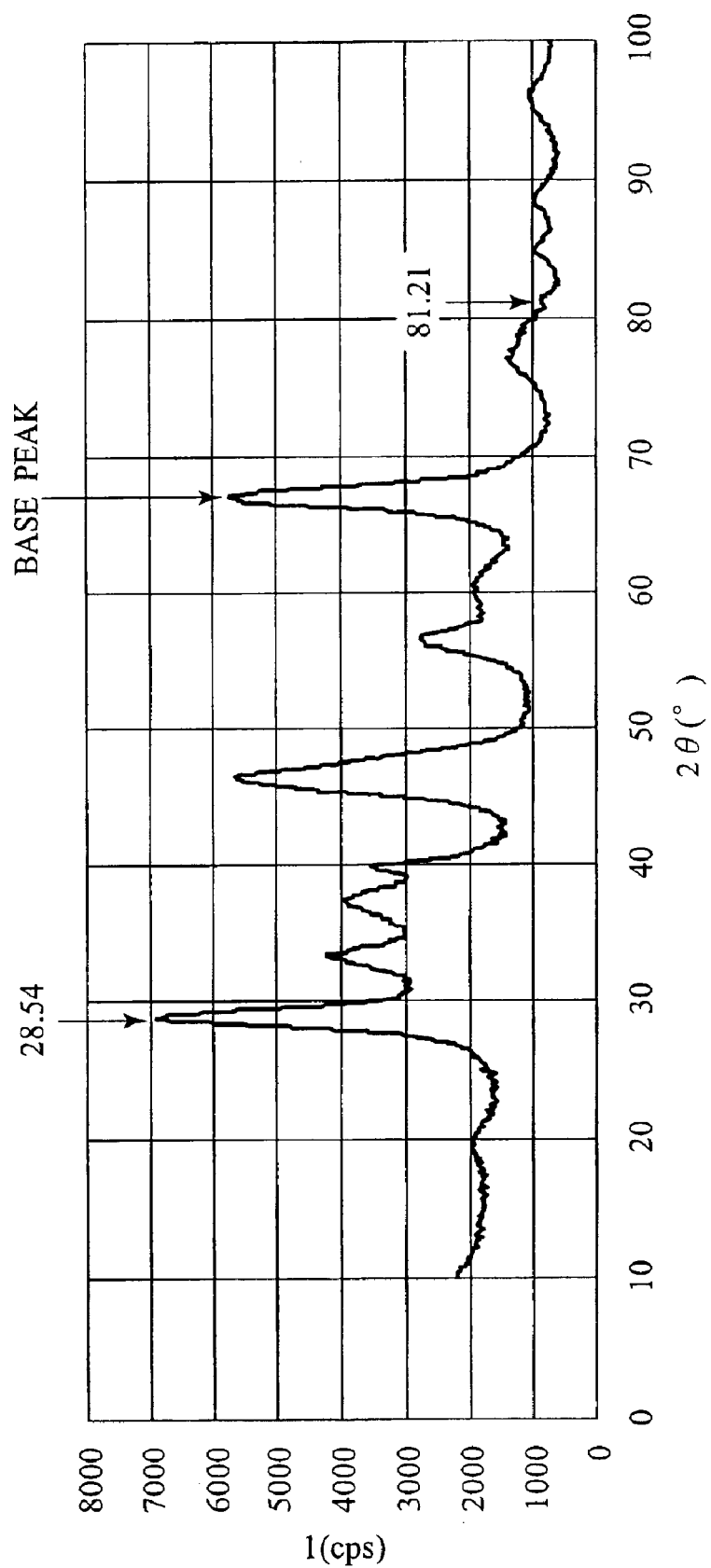
FIG. 5 is an X-ray diffraction pattern of powder F according to the comparative example of the present invention.
Figure 6:
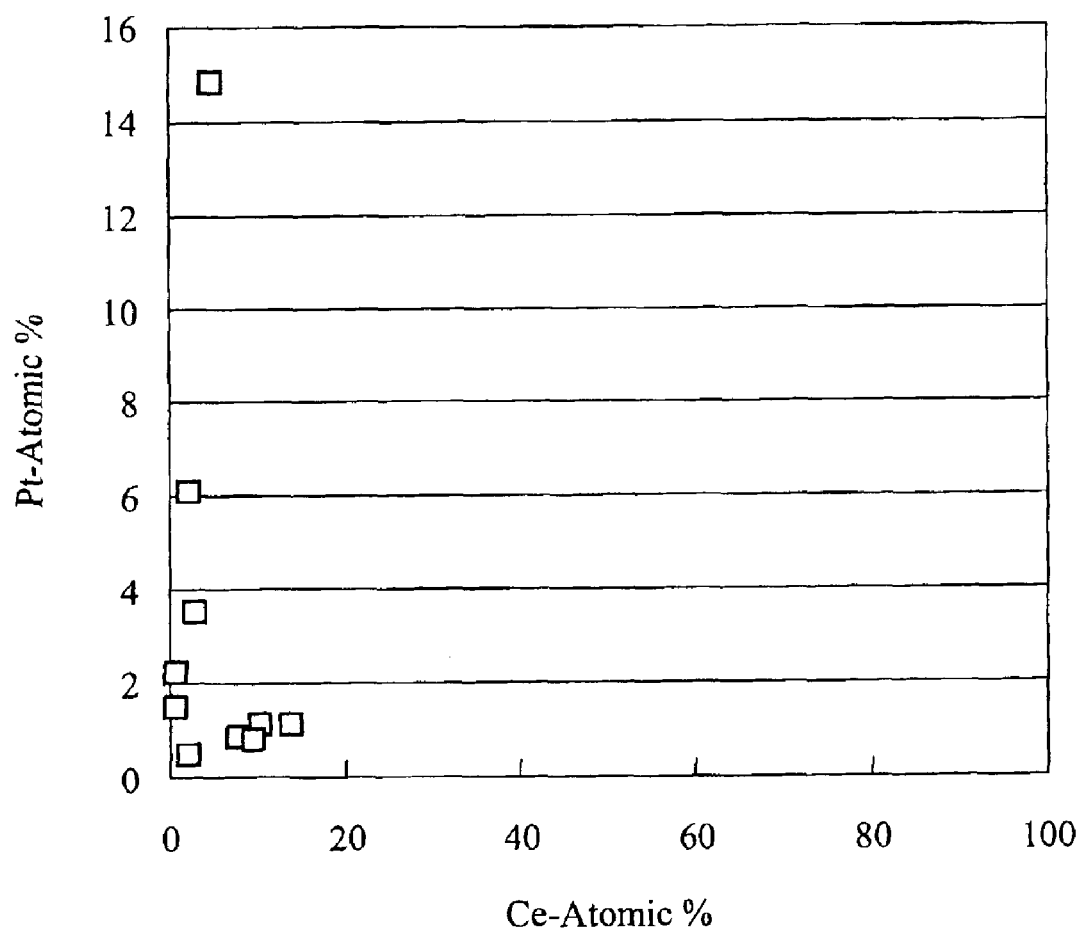
FIG. 6 is a graph showing a relationship between atomic ratios of Ce and Pt according to the powder F.

A catalyst according to this Comparative example 1 was obtained in accordance with the same procedures as those of the above-described Example 1 except that the cerium acetate was replaced with the cerium nitrate in the preparation of the powders A and C of Example 1 and that the tetraammine platinum hydroxide solution was replaced with the dinitrodiamine platinum salt solution in the preparation of the powder A, C and D. Note that powder obtained by replacing the cerium nitrate of the powder A with the cerium nitrate and replacing the tetraammine platinum hydroxide solution with the dinitrodiamine platinum salt solution was set as powder F, and properties of this powder F are also shown in Table 1. Moreover, results of X-ray diffraction measurements of the powder F after baking at 700° C. are shown in FIG. 5, and correlations between atomic ratios of Ce and Pt, which were obtained from TEM observations, are shown in FIG. 6. Furthermore, the integrated intensities and the relative intensities of the respective peaks in FIG. 5 are shown in Table 4. Relative intensities are calculated on the basis of the peak of alumina (2θ=66.88), which is used as the porous carrier.

TABLE 4

| Peak number | 2θ (°) | Integrated Intensity | Relative Intensity |
|---|---|---|---|
| 1 | 28.54 | 378000 | 75.00 |
| 2 | 33.02 | 507000 | 100.60 |
| 3 | 37.20 | 247000 | 49.01 |
| 4 | 39.66 | 117000 | 23.21 |
| 5 | 46.38 | 452000 | 89.68 |
| 6 | 56.34 | 148100 | 29.37 |
| 7 | 60.06 | 217000 | 43.06 |
| 8 | 66.89 | 504000 | 100.00 |
| 9 | 77.53 | 138000 | 27.38 |
| 10 | 81.21 | 231 | 0.05 |
| 11 | 84.81 | 29300 | 5.81 |
| 12 | 88.32 | 108000 | 21.43 |

COMPARATIVE EXAMPLE 2

A catalyst according to this Comparative example 2 was obtained in accordance with the same procedures as those of the above-described Example 1 except that impregnation of the cerium acetate was not performed in the preparation of the powder A and C of Example 1. Then, powder excluding the cerium acetate of the powder A was set as powder G, and properties thereof are also shown in Table 1.

EXAMPLE 3

First, active alumina (γ-alumina) having a specific surface area of 200 m$^2$/g was impregnated with a mixed solution of cerium acetate, zirconium acetate and lanthanum acetate, dried at 120° C. for 1 hour, and was then baked at 400° C. in the air for 1 hour to obtain powder. This powder had a Ce concentration of 10 wt % as $CeO_2$, a Zr concentration of 6.5 wt % as $ZrO_2$, and a La concentration of 5.8 wt % as $La_2O_3$. This powder was impregnated with a tetraammine platinum hydroxide solution, dried at 120° C. for 1 hour, and thereafter, baked at 400° C. in the air for 1 hour. Thus, powder H was obtained. The Pt concentration of this powder H was 0.8 wt %.

Moreover, active alumina (γ-alumina) having a specific surface area of 200 m$^2$/g was impregnated with a mixed solution of cerium acetate, zirconium acetate and lanthanum acetate, dried at 120° C. for 1 hour, and was then baked at 400° C. in the air for 1 hour to obtain powder. This powder had a Ce concentration of 10 wt % as $CeO_2$, a Zr concentration of 6.5 wt % as $ZrO_2$, and a La concentration of 5.8 wt % as $La_2O_3$. This powder was impregnated with a tetraammine platinum hydroxide solution, dried at 120° C. for 1 hour, and thereafter, baked at 400° C. in the air for 1 hour. Thus, powder I was obtained. The Pt concentration of this powder was 0.4 wt %.

Then, the above-described powder I of 724.5 g, the powder D of 42.3 g, active alumina (γ-alumina) of 88.2 g, alumina sol of 45 g and water of 900 g were poured into a magnetic ball mill, and were then mixed and milled to obtain a slurry solution. This slurry solution had acetic acid added so that the pH thereof could be 6.0. Then, this slurry was applied to a cordierite monolithic support (900 cells, catalyst capacity of 1.2 L), dried at 130° C. after removing extra slurry in the cells by airflow, and baked at 400° C. for 1 hour. Thus, a catalyst having a coating layer of 300 g/L was obtained. Subsequently, the above-described powder H of 543.6 g, the powder D of 63.5 g, the powder B of 212.4 g, active alumina (γ-alumina) of 35.5 g, alumina sol of 45 g and water of 900 g were poured into a magnetic ball mill, were then mixed and milled to obtain a slurry solution. The slurry solution thus obtained had acetic acid added so that the pH thereof could be 6.0. Then, this slurry solution was applied to the above-described catalyst coating layer, dried at 130° C. after removing extra slurry in the cells by airflow, and baked at 400° C. for 1 hour. Thus, a catalyst having a coating layer of 200 g/L was obtained. Then, this catalyst was immersed in a mixed solution of cesium acetate and cerium acetate to be impregnated with cesium and cerium. The amount of cesium was 50 g/L as $Cs_2O$, and the amount of cerium was 10 g/L as $CeO_2$.

EXAMPLE 4

First, active alumina (γ-alumina) having a specific surface area of 200 m$^2$/g was impregnated with a palladium acetate solution, dried at 120° C. for 1 hour, and was then baked at 400° C. in the air for 1 hour to obtain powder K. Pd concentration of this powder was 0.4 wt %.

Then, the above-described powder K of 441.9 g, the powder C of 282.9 g, the powder D of 42.3 g, active alumina (γ-alumina) of 87.9 g, alumina sol of 45 g and water of 900 g were poured into a magnetic ball mill, were then mixed and milled, and thus a slurry solution was obtained. The slurry solution thus obtained had acetic acid added so that the pH thereof could be 6.0. Then, this slurry was applied to a cordierite monolithic support (900 cells, catalyst capacity of 1.2 L), dried at 130° C. after removing extra slurry in the cells by airflow, and baked at 400° C. for 1 hour. Thus, a catalyst having a coating layer of 300 g/L was obtained. Subsequently, the above-described powder A of 543.6 g, the powder D of 63.5 g, the powder B of 212.4 g, active alumina of 35.5 g, alumina sol of 45 g and water of 900 g were poured into a magnetic ball mill, and were then mixed and milled. Thus a slurry solution was obtained. The slurry solution thus obtained had acetic acid added so that the pH thereof could be 6.0. Then, this slurry solution was applied to the above-described catalyst coating layer, dried at 130° C. after removing extra slurry in the cells by airflow, and baked at 400° C. for 1 hour. Thus, a catalyst having a coating layer of 200 g/L was obtained. Furthermore, this catalyst was immersed in a mixed solution of cesium acetate and cerium acetate to be impregnated with cesium and cerium. The amount of cesium was 50 g/L as $Cs_2O$, and the amount of cerium was 10 g/L as $CeO_2$.

EXAMPLE 5

A catalyst according to this Example 5 was obtained in accordance with the same procedures as those of the above-described Example 1 except that the cesium acetate impregnated last in Example 1 was replaced with sodium acetate.

EXAMPLE 6

A catalyst according to this Example 6 was obtained in accordance with the same procedures as those of the Example 1 except that the cesium acetate impregnated last in Example 1 was replaced with potassium acetate.

EXAMPLE 7

A catalyst according to this Example 7 was obtained in accordance with the same procedures as those of the Example 1 except that the mixed solution of cesium acetate and cerium acetate, which was impregnated last in Example 1, was replaced with a cesium acetate solution only.

EXAMPLE 8

In preparation of the powder A of the Example 1, a mixed solution of cerium nitrate and zirconium nitrate was impregnated instead of the cerium acetate solution, and thus powder A' was obtained. The Ce concentration of this powder was 7.5 wt % as $CeO_2$, and Zr concentration thereof was 2.5 wt % as $ZrO_2$. In accordance with the same procedures as those of the Example 1 other than the above, a catalyst according to this Example 8 was obtained.

EXAMPLE 9

First, active alumina (γ-alumina) having a specific surface area of 200 $m^2/g$ was impregnated with a cerium acetate solution, dried at 120° C. for 1 hour, and was then baked at 400° C. in the air for 1 hour to obtain powder. The Ce concentration of this powder was 10 wt % as $CeO_2$. This powder was impregnated with a tetraammine platinum hydroxide solution, dried at 120° C. for 1 hour, and, thereafter, baked at 400° C. in the air for 1 hour. Thus, powder L was obtained. The Pt concentration of this powder L was 1.0 wt %.

Next, the above-described powder L of 720.0 g, the powder B of 150.0 g, alumina sol of 30 g and water of 900 g were poured into a magnetic ball mill, were then mixed and milled, and thus a slurry solution was obtained. The slurry solution thus obtained had acetic acid added so that the pH thereof could be 6.0. Then, this slurry was applied to a cordierite monolithic support (900 cells, catalyst capacity of 1.2 L), dried at 130° C. after removing extra slurry in the cells by airflow, and baked at 400° C. for 1 hour. Thus, a catalyst having a coating layer of 300 g/L was obtained. Then, this catalyst was immersed in a mixed solution of cesium acetate and cerium acetate to be impregnated with cesium and cerium. The amount of cesium was 30 g/L as $Cs_2O$, and the amount of cerium was 10 g/L as $CeO_2$.

EXAMPLE 10

As a HC absorbing material, β-zeolite was used, and this HC absorbing material, silica sol and water were poured into a magnetic ball mill, were then mixed and milled, and thus a slurry solution was obtained. This slurry solution was applied to a cordierite monolithic support (900 cells, catalyst capacity of 1.2 L), and dried at 130° C. after removing extra slurry in the cells by airflow, followed by baking at 400° C. for 1 hour. Thus a coating layer of 200 g/L was loaded thereon. Then, the powder L of 720.0 g, the powder B of 150.0 g, alumina sol of 30 g and water of 900 g were poured into a magnetic ball mill, were then mixed and milled, and thus a slurry solution was obtained. The slurry solution thus obtained had acetic acid added so that the pH thereof could be 6.0. Then, this slurry solution was applied to the above-described catalyst coating layer, dried at 130° C. after removing extra slurry in the cells by airflow, and baked at 400° C. for 1 hour. Thus, a catalyst having a coating layer of 300 g/L was obtained. Furthermore, this catalyst was immersed in a mixed solution of cesium acetate and cerium acetate to be impregnated with cesium and cerium. The amount of cesium was 30 g/L as $Cs_2O$, and the amount of cerium was 10 g/L as $CeO_2$.

<Test Method 1>

EXAMPLES 1 to 8, COMPARATIVE EXAMPLES 1 AND 2

(1) Durability Test Method

Each catalyst was mounted on the exhaust system of an engine having an engine swept volume of 4,400 cc, regular gasoline (sulfur content: 10 ppm or less) was used, and the temperature of the catalyst inlet was set at 700° C. Under these conditions, the engine was driven for 50 hours.

(2) Sulfur Poisoning Durability Test Method

Each catalyst was mounted on the exhaust system of an engine having an engine swept volume of 2,000 cc, sulfur-mixed gasoline (sulfur content: 300 ppm) was used, and the temperature of the catalyst inlet was set at 400° C. Under these conditions, the engine was driven for 5 hours. In this case, a drive cycle with 1-minute lean running (A/F=25) and 2-second rich running (A/F=11.0) was repeated.

(3) Sulfur Poisoning Recovery Treatment

Each catalyst was mounted on the exhaust gas system of an engine having an engine swept volume of 2,000 cc, regular gasoline (sulfur content: 10 ppm or less) was used, the temperature of the catalyst inlet was set at 700° C., and a air/fuel ratio was set equal to 14.2. Under these conditions, the engine was driven for 10 minutes.

(4) Evaluation Method

Each catalyst was mounted on the exhaust gas system of an engine having an engine swept volume of 2,000 cc. Then, the vehicle having the engine was run on the 10–15 mode after the durability test at 700° C. for 50 hours and after the sulfur poisoning recovery treatment respectively, and an inversion rate on each mode for the above-described case was obtained. Note that, in the mode, the vehicle was driven under the following conditions: a lean state (A/F=25) during constant running, fuel cut during deceleration, and a rich state (A/F=11.0 for 2 seconds) followed by a stoichiometric state (A/F=14.3) during acceleration. Note that the temperature of the catalyst inlet was 400° C. Moreover, the evaluation was performed by locating a three-way catalyst before the catalyst. Results of the evaluation are shown in Table 5.

TABLE 5

| | | Mode inversion rate (%) | | | | | |
|---|---|---|---|---|---|---|---|
| | | Before sulfur poisoning | | | After sulfur poisoning recovery treatment | | |
| | Powder | HC | CO | NOx | HC | CO | NOx |
| Example 1 | A | 80.3 | 98.1 | 99.0 | 80.1 | 98.0 | 98.2 |
| Example 2 | E | 80.1 | 98.1 | 98.5 | 80.0 | 98.0 | 95.3 |
| Example 3 | H | 82.5 | 98.6 | 99.3 | 82.3 | 98.4 | 98.9 |
| Example 4 | A | 82.8 | 98.5 | 99.4 | 82.6 | 98.3 | 99.1 |
| Example 5 | A | 81.4 | 98.3 | 92.1 | 81.2 | 98.2 | 91.8 |
| Example 6 | A | 80.7 | 97.9 | 95.4 | 80.4 | 97.8 | 93.2 |
| Example 7 | A | 80.0 | 97.2 | 98.2 | 79.9 | 97.1 | 94.3 |
| Example 8 | A' | 80.3 | 98.2 | 99.2 | 80.1 | 98.0 | 98.5 |
| Comparative example 1 | F | 80.1 | 98.0 | 85.2 | 79.8 | 97.4 | 80.3 |
| Comparative example 2 | G | 79.1 | 95.3 | 70.2 | 77.3 | 94.9 | 65.1 |

<Test Method 2>

EXAMPLES 9 AND 10

(1) Durability Test Method

Each catalyst was mounted on the exhaust system of an engine having an engine swept volume of 4,400 cc, regular gasoline (sulfur content: 10 ppm or less) was used, and the temperature of the catalyst inlet was set at 700° C. Under these conditions, the engine was driven for 50 hours.

(2) Evaluation Method

Each catalyst was mounted on the exhaust gas system of an engine having an engine swept volume of 2,000 cc. Then, the vehicle having the engine was run on the 11 mode, and the exhaust gas purification rate of each Example was obtained.

Results of the evaluation are shown in Table 6.

TABLE 6

| | Powder | HC purification rate (%) |
|---|---|---|
| Example 9 | L | 82.1 |
| Example 10 | L | 90.8 |

From the results of Table 1, the following was proven. In the powder F using cerium nitrate and dinitrodiamine platinum salt and the powder G that does not load cerium thereon, the Pt dispersions are inferior to those of the powder A and E that load platinum and cerium thereon. Therefore, if both platinum and cerium are not loaded on the powder, then the specific surface area thereof is greatly lowered, and the dispersion is significantly lowered due to the baking. Moreover, even if both platinum and cerium are loaded, in the case of the powder F using dinitrodiamine platinum salt for platinum salt, the Pt dispersion is inferior to that in the case of using tetraammine platinum hydroxide (the powders A and E), and the reduction rate of the dispersion is increased. Moreover, in the X-ray diffraction, in the powders A and E, the peaks originating from the Pt (311) plane do not appear, in other words, the integrated intensity of the diffraction peak originating from the Pt (311) plane is about zero (FIGS. 1 and 3, Tables 2 and 3). On the other hand, in the powder F, a metal peak is recognized at an angle of: $2\theta=81.21°$ (FIG. 5, Table 4).

Moreover, FIGS. 2, 4 and 6 show the atomicity of Al, Ce and Pt measured by EDX (Energy dispersive X-ray analysis) while performing the TEM observations. In these graphs, a linear relationship between Pt and Ce is recognized in each of the powders A and E using tetraammine platinum hydroxide, which is equal to a relationship between additive amounts of Pt and Ce, and Pt and Ce have a good dispersion relationship. On the contrary, in the case of the powder F using dinitrodiamine platinum salt, a clear correlation thereof with Ce is not recognized, and it is conceived that Pt and Ce exist locally in lump form and are not dispersed well.

Then, as shown in Table 5, it is confirmed that the catalysts according to Comparative example 1 using the powder F and Comparative example 2 using the powder G are inferior in NOx purification performance to the catalysts according to Examples 1 and 2 using the powders A and E, respectively.

Moreover, in the catalyst of Example 3, which was added with La and Zr as well as Ce, the NOx purification performance is superior to that of the catalyst of Example 1, and a durability improvement effect due to La and Zr is confirmed. In the catalyst of Example 4, which contained Pd, an effect of Pd is recognized, and this catalyst is proven to be excellent particularly in NOx purification performance after the sulfur poisoning recovery treatment.

Furthermore, in the catalysts according to Examples 5 and 6, in which cesium acetate in the catalyst of Example 1 was substituted for sodium acetate and potassium acetate, respectively, and in the catalyst according to Example 7, from which cerium acetate was excluded, it is confirmed that the NOx purification performances are inferior to that of the catalyst of Example 1. It is further confirmed that Cs is excellent as an absorbing material and the NOx purification performance after the sulfur poisoning recovery treatment is greatly improved by impregnating Cs with Ce simultaneously. Moreover, in the catalyst according to Example 8, in which ceria was substituted for the ceria-zirconia composite oxide, it is proven that the thermal resistance is excellent and the extent of the performance lowering after the durability test is small when compared with the catalyst of Example 1.

Then, from Table 6, as a result of a comparison of the catalyst of Example 9 with the catalyst according to Example 10 that used β-zeolite in the inner layer of the catalyst of Example 9, the HC absorbing effect at low temperature due to zeolite in the inner layer is confirmed.

The entire content of a Japanese Patent Application No. P2002-130801 with a filing date of May 2, 2002 is herein incorporated by reference.

Although the invention has been described above by reference to certain embodiments of the invention, the invention is not limited to the embodiments described above will occur to these skilled in the art, in light of the teachings. The scope of the invention is defined with reference to the following claims.

What is claimed is:

1. An exhaust gas purifying catalyst, comprising:
   a powder comprising a porous material having a specific surface area of 150 $m^2/g$ or more, cerium, and platinum, wherein cerium and platinum are loaded on the porous material,
   wherein the powder has platinum dispersion of 70% or more before baking and platinum dispersion of 50% or more after baking in air at 700° C., and a reduction rate R of the platinum dispersion after the baking against the platinum dispersion before the baking is below 40%, the reduction rate R being represented by a following equation (1):

$$R=(1-(\text{Pt dispersion after baking})/(\text{Pt dispersion before baking}))\times 100 \quad (1).$$

2. The exhaust gas purifying catalyst of claim 1, wherein the reduction rate R of the platinum dispersion is below 30%.

3. The exhaust gas purifying catalyst of claim 1, wherein, in an X-ray diffraction measurement by use of a CuKα radiation after the baking in the air at 700° C. for one hour, an integrated intensity ratio Ri of a diffraction peak originating from a $CeO_2$ (111) plane at a diffraction angle of: $2\theta=28.58\pm0.1°$ and a diffraction peak originating from a γ-alumina at a diffraction angle of: $2\theta=66.89\pm0.1°$ is below 70, the Ri being represented by the following equation (2):

$$Ri=(\text{integrated intensity of }CeO_2)/(\text{integrated intensity of γ-alumina})\times 100 \quad (2).$$

4. The exhaust gas purifying catalyst of claim 1, wherein at least a part of platinum in the powder exists on a cerium compound coming of cerium.

5. The exhaust gas purifying catalyst of claim 1, wherein the porous material of the powder is alumina.

6. The exhaust gas purifying catalyst of claim 1, further comprising:
a compound comprised of at least one element selected from the group consisting of alkali metals, alkaline earth metals and rare earth metals.

7. The exhaust gas purifying catalyst of claim 6, wherein the compound is a cesium compound or a cerium compound.

8. The exhaust gas purifying catalyst of claim 1, wherein the catalyst has two or more catalyst layers.

9. The exhaust gas purifying catalyst of claim 8, wherein an innermost layer of the catalytic layers is a zeolite layer.

10. The exhaust gas purifying catalyst of claim 1, further comprising;
rhodium and/or palladium.

11. The exhaust gas purifying catalyst of claim 1, further comprising;
ceria and/or ceria-zirconia composite oxide.

12. The exhaust gas purifying catalyst of claim 1, wherein the powder includes zirconium and/or lanthanum.

13. An exhaust gas purifying catalyst, comprising:
a powder comprising a porous material having a specific surface area of 150 m²/g or more, cerium and platinum, wherein cerium and platinum are loaded on the porous material,
wherein the powder has platinum dispersion of 70% or more before baking and platinum dispersion of 50% or more after baking in air at 700° C., and
an integrated intensity of a diffraction peak originating from a Pt (311) plane at a diffraction angle of: $2\theta=81.37\pm0.2°$ is about zero in an X-ray diffraction measurement by use of a CuKα radiation after the baking.

14. A method for manufacturing an exhaust gas purifying catalyst, comprising:
preparing an aqueous slurry containing a powder comprising a porous material having a specific surface area of 150 m²/g or more, cerium and platinum, wherein cerium and platinum are loaded on the porous material;
adjusting pH of the aqueous slurry to a range from 5.8 to 6.3 inclusive;
applying the aqueous slurry having the adjusted pH to a thermal-resistant inorganic support;
drying the support having the slurry applied thereto; and
baking the support after the drying,
wherein the powder has platinum dispersion of 70% or more before heating and platinum dispersion of 50% or more after heating in air at 700° C., and
a reduction rate R of the platinum dispersion after the heating against the platinum dispersion before the heating is below 40%, the reduction rate R being represented by a following equation (1):

$$R=(1-(\text{Pt dispersion after heating})/(\text{Pt dispersion before heating}))\times 100 \quad (1).$$

15. A method for manufacturing an exhaust gas purifying catalyst, comprising:
(a) impregnating a powder of a porous material having a specific surface area of 150 m²/g or more with a cerium acetate solution, drying the powder, and then baking the powder; and
(b) impregnating the powder with a tetraammine platinum hydroxide solution, drying the powder, and then baking the powder,
wherein the powder is contained in the catalyst,
the powder having cerium and platinum loaded thereon has platinum dispersion of 70% or more before heating and platinum dispersion of 50% or more after heating in air at 700° C., and
a reduction rate R of the platinum dispersion after the heating against the platinum dispersion before the heating is below 40%, the reduction rate R being represented by a following equation (1):

$$R=(1-(\text{Pt dispersion after heating})/(\text{Pt dispersion before heating}))\times 100 \quad (1).$$

16. A method for manufacturing an exhaust gas purifying catalyst, comprising:
(a) impregnating a powder of a porous material having a specific surface area of 150 m²/g or more with a mixed solution of a cerium acetate solution and both or any one of a zirconium acetate solution and a lanthanum acetate solution, drying the powder, and then baking the powder; and
(b) impregnating the powder with a tetraammine platinum hydroxide solution, drying the powder, and then baking the powder,
wherein the powder is contained in the catalyst,
the powder having cerium, platinum and both or any one of zirconium and lanthanum loaded thereon has platinum dispersion of 70% or more before heating and platinum dispersion of 50% or more after heating in air at 700° C., and
a reduction rate R of the platinum dispersion after the heating against the platinum dispersion before the heating is below 40%, the reduction rate R being represented by a following equation (1):

$$R=(1-(\text{Pt dispersion after heating})/(\text{Pt dispersion before heating}))\times 100 \quad (1).$$

17. A method for purifying an exhaust gas, comprising:

preparing an exhaust gas purifying catalyst comprising a powder including a porous material having a specific surface area of 150 m²/g or more, cerium and platinum, wherein cerium and platinum are loaded on the porous material, wherein the powder has platinum dispersion of 70% or more before baking and platinum dispersion of 50% or more after baking in air at 700° C., and a reduction rate R of the platinum dispersion after the baking against the platinum dispersion before the baking is below 40%, the reduction rate R being represented by a following equation (1):

$$R=(1-(\text{Pt dispersion after baking})/(\text{Pt dispersion before baking}))\times 100 \quad (1);$$

and purifying an exhaust gas of an internal combustion engine, having an air/fuel ratio ranging from 10 to 50 inclusive, by contacting the exhaust gas with said exhaust gas purifying catalys.

* * * * *